(12) United States Patent
Vanghi et al.

(10) Patent No.: US 7,957,352 B2
(45) Date of Patent: Jun. 7, 2011

(54) INTER-SYSTEM HANDOFF BETWEEN WIRELESS COMMUNICATION NETWORKS OF DIFFERENT RADIO ACCESS TECHNOLOGIES

(75) Inventors: Vieri Vanghi, San Diego, CA (US); Philip Kenneth Price, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 10/786,795

(22) Filed: Feb. 24, 2004

(65) Prior Publication Data

US 2005/0073977 A1    Apr. 7, 2005

Related U.S. Application Data

(60) Provisional application No. 60/508,452, filed on Oct. 2, 2003.

(51) Int. Cl.
 *H04B 7/216* (2006.01)
(52) U.S. Cl. ........ 370/335; 455/436; 455/437; 455/438; 455/439; 455/440; 455/441; 455/442; 455/443; 455/444; 455/445; 455/446; 455/447; 455/448; 455/449; 455/450; 455/451; 455/452; 455/453; 455/454; 455/455; 455/524; 455/525; 455/552.1; 455/553.1; 455/515
(58) Field of Classification Search .......... 455/436–455, 455/552.1, 553.1, 437, 515, 525, 524; 370/335
See application file for complete search history.

(56) References Cited

U.S. PATENT DOCUMENTS

| | | | | |
|---|---|---|---|---|
| 6,493,554 | B1 * | 12/2002 | Kanerva et al. | 455/437 |
| 7,123,910 | B2 * | 10/2006 | Lucidarme et al. | 455/434 |
| 7,130,284 | B2 * | 10/2006 | Lee et al. | 370/331 |
| 2001/0016493 | A1 * | 8/2001 | Kim et al. | 455/436 |
| 2003/0139184 | A1 * | 7/2003 | Singh et al. | 455/436 |
| 2004/0203469 | A1 * | 10/2004 | Patel et al. | 455/67.14 |

FOREIGN PATENT DOCUMENTS

| | | |
|---|---|---|
| CN | 1304269 | 7/2001 |
| EP | 1257141 | 5/2001 |
| EP | 1209941 | 5/2002 |
| EP | 1349413 | 3/2003 |

* cited by examiner

*Primary Examiner* — Patrick N Edouard
*Assistant Examiner* — Shantell Heiber
(74) *Attorney, Agent, or Firm* — Kristine U. Ekwueme

(57) ABSTRACT

Various schemes for performing inter-system handoff, e.g., from a UTRAN to a cdma2000 radio access network (RAN) are described. For a MAHHO scheme, the UTRAN uses measurements obtained by a multi-RAT device to determine suitable cdma2000 cell(s) for handover. The measurements are obtained by a candidate frequency search procedure, and the handover is accomplished by a handoff execution procedure. For a MDHHO scheme, the UTRAN relies on location information for the multi-RAT device to select suitable cdma2000 cell(s) for handover. For a CRHHO scheme, a new call is established on the cdma2000 RAN and the pending call on the UTRAN is released in a manner such that the handover appears seamless to the multi-RAT device. The multi-RAT device includes two modem processors that perform processing for the UTRAN and cdma2000 RAN and an application processor that controls the modem processors.

31 Claims, 12 Drawing Sheets

INTER-SYSTEM HANDOFF BETWEEN WIRELESS COMMUNICATION NETWORKS OF DIFFERENT RADIO ACCESS TECHNOLOGIES

This application claims the benefit of provisional U.S. Application Ser. No. 60/508,452, entitled "Inter-System Handoff Procedures," filed Oct. 2, 2003.

BACKGROUND

I. Field

The present invention relates generally to communication, and more specifically to techniques for performing inter-system handoff of a wireless device between two wireless communication networks of different radio access technologies.

II. Background

Wireless communication systems are widely deployed to provide various communication services such as voice, packet data, and so on. These systems may be multiple-access systems capable of supporting multiple users by sharing the available system resources. Examples of such multiple-access systems include Code Division Multiple Access (CDMA) systems, Time Division Multiple Access (TDMA) systems, and Frequency Division Multiple Access (FDMA) systems. A CDMA system may implement a radio access technology (RAT) such as Wideband CDMA (W-CDMA), cdma2000, and so on. RAT refers to the technology used for over-the-air communication. A TDMA system may implement a RAT such as Global System for Mobile Communications (GSM). W-CDMA and GSM are described in a set of documents from a consortium named "$3^{rd}$ Generation Partnership Project" (3GPP). cdma2000 is described in a set of documents from a consortium named "$3^{rd}$ Generation Partnership Project 2" (3GPP2). 3GPP and 3GPP2 documents are publicly available.

W-CDMA and cdma2000 are third generation (3G) RATs that can provide enhanced services and capabilities (e.g., higher data rates, concurrent voice and data calls, and so on). W-CDMA and cdma2000 utilize different signal processing and controls. Thus, a CDMA system implements either W-CDMA or cdma2000, if at all.

A wireless multi-RAT device (e.g., a dual-mode cellular phone) may have the capability to communicate with both W-CDMA and cdma2000 systems. This may then allow a user/subscriber to obtain services from both W-CDMA and cdma2000 systems and to extend coverage with the same device. For example, the multi-RAT device may initially establish communication with a W-CDMA system and thereafter move out of the coverage area of the W-CDMA system and into the coverage area of a cdma2000 system. In this scenario, it would be desirable to hand off (or hand over) the multi-RAT device from the W-CDMA system to the cdma2000 system in a manner such that the pending communication is minimally interrupted. Unfortunately, no provisions are currently described by 3GPP and 3GPP2 for performing handoff from the W-CDMA system to the cdma2000 system.

There is therefore a need in the art for techniques to perform an inter-system handoff for a multi-RAT device, e.g., from a W-CDMA system to a cdma2000 system.

SUMMARY

Techniques for performing inter-system handoff using various schemes are described herein. These schemes include a measurement assisted hard handoff (MAHHO) scheme, a measurement directed hard handoff (MDHHO) scheme, and a call re-establishment hard handoff (CRHHO) scheme. These schemes may be performed for a multi-RAT device having, for example, (1) a first modem processor that performs processing for a first ("serving") wireless network with which a call is currently pending, (2) a second modem processor that performs processing for a second ("target") wireless network to which the device is to be handed over, and (3) an application processor that controls the first and second modem processors. The first and second wireless networks may be, for example, a UMTS (Universal Mobile Telecommunications System) Terrestrial Radio Access Network (UTRAN) and a cdma2000 radio access network (RAN), respectively.

For the MAHHO scheme, the UTRAN uses measurements obtained by the multi-RAT device to determine suitable cdma2000 cell(s) to hand over the device. The measurements are obtained by performing a candidate frequency search procedure, and the handover is accomplished by performing a handoff execution procedure. For the MDHHO scheme, the UTRAN relies on location information for the multi-RAT device to select the most suitable cdma2000 cell(s) for handover. For the CRHHO scheme, a new call is established on the target wireless network and the pending call on the serving wireless network is released. The new call may be originated or terminated by the multi-RAT device. The call establishment and call release may also be performed such that the handover appears seamless to the multi-RAT device and communication is minimally disrupted. Exemplary signal flows for all three inter-system handoff schemes are described below.

In an embodiment for the CRHHO scheme, the first modem processor performs processing for a pending call with the first wireless network (e.g., the UTRAN), receives a first message (e.g., a Handover from UTRAN Command) from the first wireless network to perform a handoff to the second wireless network (e.g., a cdma2000 RAN), and provides notification of the handoff. The application processor receives the notification from the first modem processor and directs the second modem processor to establish a new call with the second wireless network. In response, the second modem processor establishes traffic channels with the second wireless network and performs processing for the new call. The first wireless network releases the pending call and the application processor switches datapath from the first to second wireless network (e.g., switches from UTRAN to cdma2000 vocoder).

Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The inter-system handoff techniques described herein may be used for various wireless communication systems and networks. A network typically refers to a deployment of a system, although these two terms are often used interchangeably. Handoff and handover, which are terms that are also used interchangeably, refer to a process of transferring or handing over a wireless device from one network controller to another network controller. For clarity, these techniques are specifically described for handoff from a UTRAN to a cdma2000 RAN. In the following description, UMTS generically refers to the technology described by 3GPP, and cdma2000 generically refers to the technology described by 3GPP2.

Figure 1:
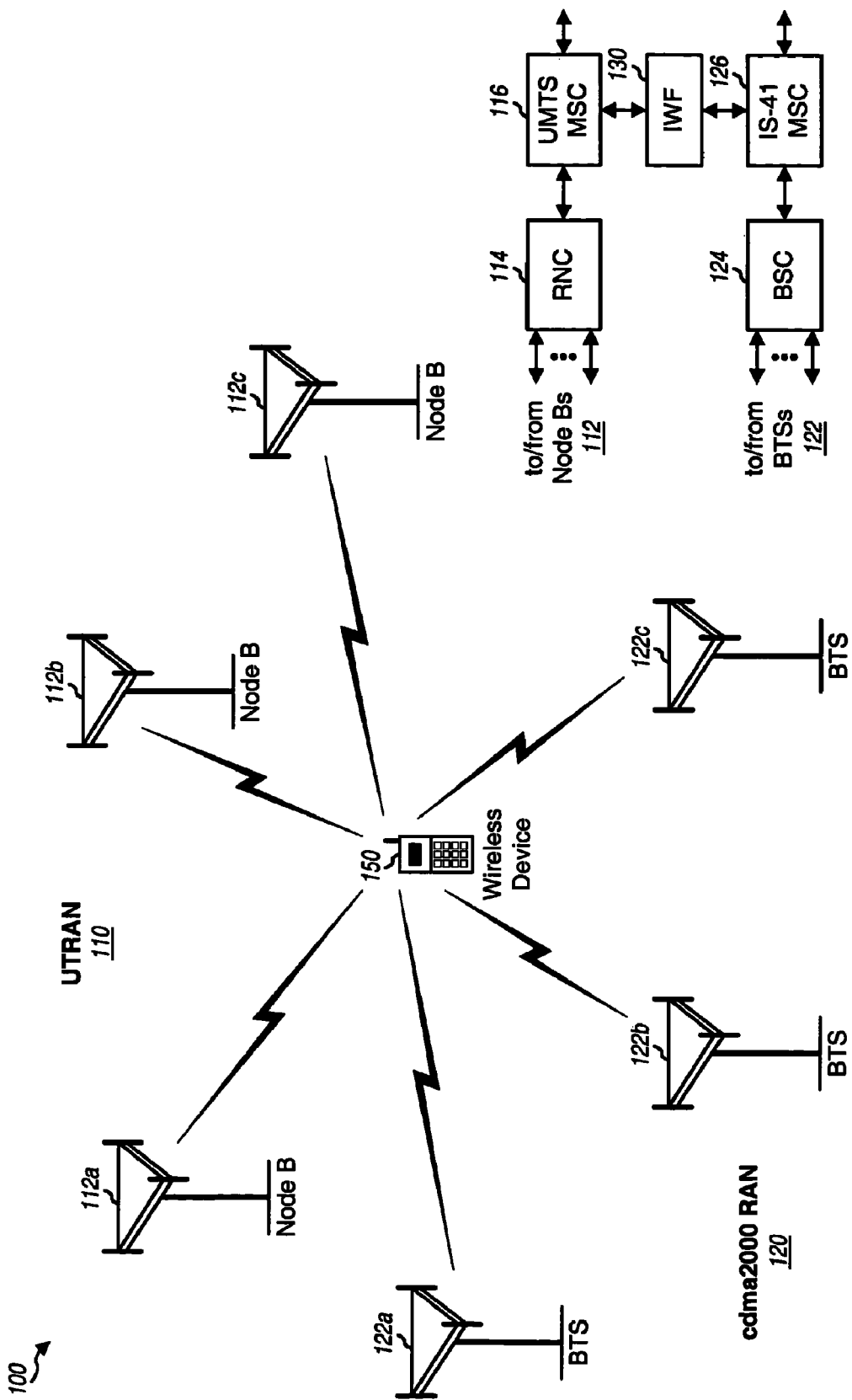
FIG. 1 shows a deployment that includes a UTRAN and a cdma2000 RAN.

FIG. 1 shows a deployment 100 that include a UTRAN 110 and a cdma2000 RAN 120. UTRAN 110 may support W-CDMA for a frequency division duplex (FDD) mode and/or GSM for a time division duplex (TDD) mode. The W-CDMA standard is the portion of the 3GPP description that relates to W-CDMA.

UTRAN 110 includes (1) Node Bs 112 that provide communication for wireless devices within the coverage area of the UTRAN and (2) a radio network controller (RNC) 114 that provides coordination and control for the Node Bs. RNC 114 further interfaces with a core network (CN), which performs switching and routing of user traffic and provides network management functions. The core network includes various network entities such as a UMTS mobile switching center (MSC) 116. UMTS MSC 116 provides circuit switched communication (e.g., for voice calls) and further supports GSM Mobile Application Part (GSM-MAP), which is a mobile networking protocol that allows for roaming and advanced services.

Similarly, cdma2000 RAN 120 includes (1) base transceiver systems (BTSs) 122 that provide communication for wireless devices within the coverage area of the cdma2000 RAN and (2) a base station controller (BSC) 124 that provides coordination and control for the BTSs. cdma2000 RAN 120 may implement IS-2000, IS-856, IS-95, and/or other standards that are based on the documents published by 3GPP2. BSC 124 further interfaces with other network entities such as an IS-41 MSC 126. IS-41 MSC 126 provides circuit switched communication and further supports ANSI-41, which is another mobile networking protocol that allows for roaming and advanced services. IS-41 MSC 126 communicates with UMTS MSC 116 via an interworking function (IWF) 130, which provides an interface between the UTRAN and cdma2000 RAN. IWF 130 may implement IS-41 Handover Application Part (HAP), which is an extension to GSM-MAP.

The Node Bs and BTSs are base stations in the UTRAN and cdma2000 RAN, respectively. Each base station provides communication coverage for a particular geographic area. A base station and/or its coverage area are commonly referred to as a "cell", depending on the context in which the term is used.

A wireless multi-RAT device 150 (e.g., a dual-mode cellular phone) has the capability to communicate with both UTRAN 110 and cdma2000 RAN 120. This capability allows a user/subscriber to obtain services from both networks with the same device. Multi-RAT device 150 may be fixed or mobile and is referred to as a user equipment (UE) in 3GPP terminology and a mobile station (MS) in 3GPP2 terminology. Multi-RAT device 150 may communicate with one or more base stations on the downlink and/or uplink at any given moment. The downlink (or forward link) refers to the communication link from the base station to the device, and the uplink (or reverse link) refers to the communication link from the device to the base station.

Figure 2:
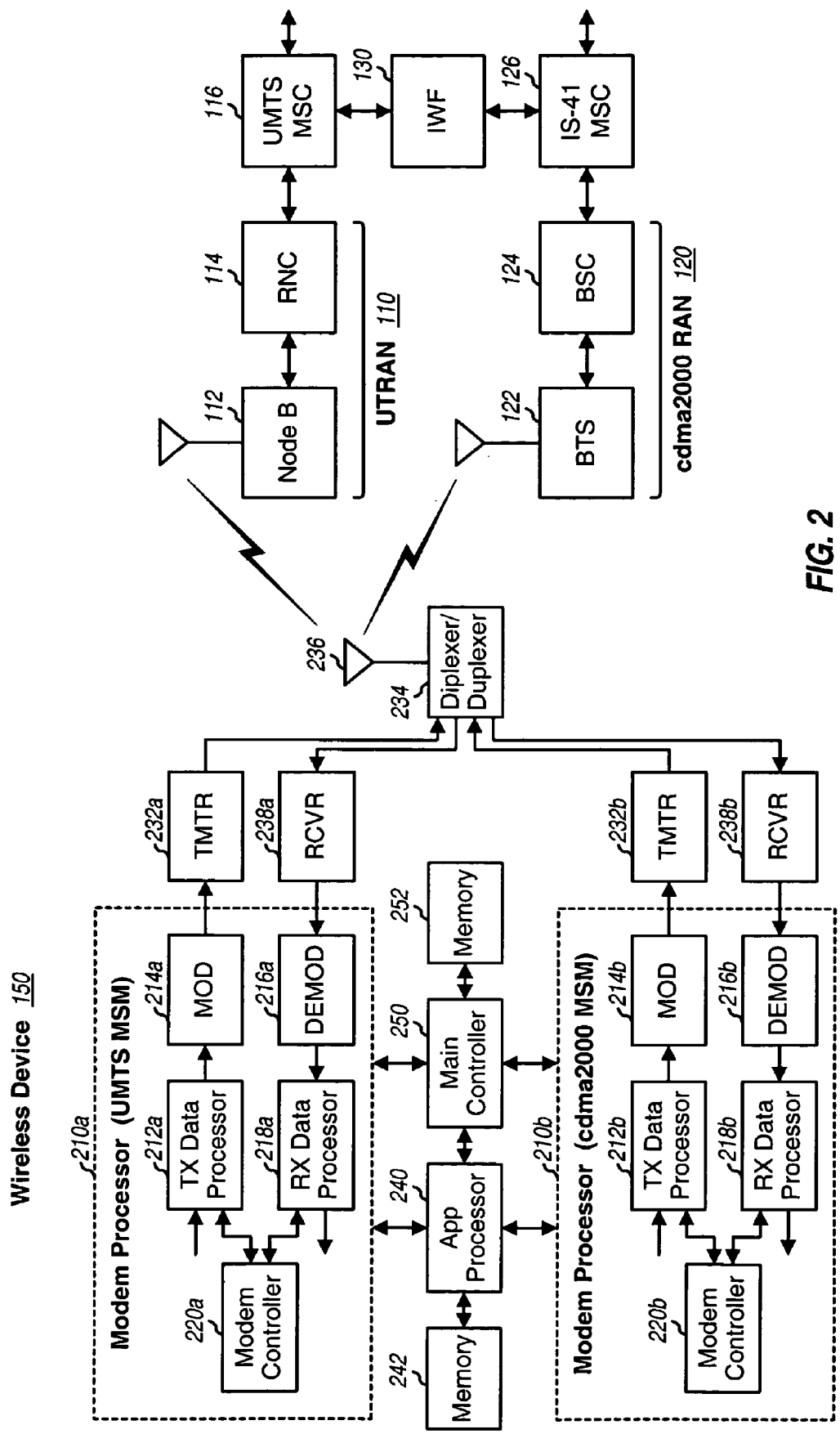
FIG. 2 shows a multi-RAT device with two modem processors.

FIG. 2 shows an embodiment of multi-RAT device 150, which includes two modem processors 210a and 210b. Modem processor 210a performs processing for downlink and uplink transmissions for UMTS, as described in 3GPP TS 25-321, TS 25-308, TS 25-212, and other 3GPP documents. Modem processor 210b performs processing for downlink and uplink transmissions for one of the CDMA standards based on 3GPP2 documents, e.g., for IS-2000, as described in 3GPP2 C.S0002-C, entitled "Physical Layer Standard for cdma2000 Spread Spectrum Systems, Release C," which is publicly available. Modem processors 210a and 210b are also referred to herein as a UMTS Mobile Station Modem (UMTS MSM) and a cdma2000 MSM, respectively.

Within modem processor 210a, signaling and data for the uplink for UMTS are processed (e.g., formatted, encoded, and interleaved) by a transmit (TX) data processor 212a and further processed (e.g., channelized/spread, scrambled, and modulated) by a modulator (MOD) 214a to obtain a stream of data chips. A transmitter unit (TMTR) 232a then conditions (e.g., converts to analog, amplifies, filters, and frequency upconverts) the stream of data chips to generate an uplink signal. The uplink signal is routed through a diplexer/duplexer 234 and transmitted via an antenna 236 to Node B(s) 112 in the UTRAN.

On the downlink for UMTS, downlink signals from Node B(s) 112 at the UTRAN are received by antenna 236, routed through diplexer/duplexer 234, and provided to a receiver unit (RCVR) 238a. Receiver unit 238a conditions (e.g., filters, amplifies, and frequency downconverts) and digitizes the received signal to obtain samples. Within modem processor 210a, a demodulator (DEMOD) 216a receives and processes (e.g., descrambles, channelizes/despreads, and demodulates) the samples to obtain symbols. Demodulator 216a may implement a rake receiver that can process multiple signal instances (or multipath components) in the received signal, as is known in the art. A receive (RX) data processor 218a then processes (e.g., deinterleaves and decodes) the symbols, checks the received data blocks, and provides decoded data.

For the embodiment shown in FIG. 2, modem processors 210a and 210b can independently perform processing for the UTRAN and cdma2000 RAN, respectively. For example, each modem processor 210 can perform encoding and decoding for its network. Modem controllers 220a and 220b control the processing units within modem processors 210a and 210b, respectively, and further maintain protocol stacks and states for UMTS and cdma2000, respectively. This dual modem processor design can simplify the implementation of the multi-RAT device since (1) modem processor 210a may be implemented with a modem processor used for a single-mode UMTS device (with no change or minimal changes to the hardware and software) and (2) modem processor 210b may be implemented with a modem processor used for a single-mode cdma2000 device (again, with no change or minimal changes).

The two-modem design shown in FIG. 2 may be implemented in various manners. For example, each modem processor 210 may be implemented within one or more application specific integrated circuits (ASICs). An application processor 240 may be implemented within a separate integrated circuit (IC) or incorporated within an ASIC for one of the modem processors. Similarly, a main controller 250 may be implemented within a separate IC or incorporated within an ASIC for a modem processor. As another example, both modem processors 210a and 210b, application processor 240, and main controller 250 may be implemented within a single ASIC.

FIG. 2 also shows separate transmitter units 222a and 222b and separate receiver units 238a and 238b for UMTS and cdma2000. This transceiver design allows the multi-RAT device to simultaneously communicate with the UTRAN and cdma2000 RAN using separate transmit/receive paths. It may be possible to share transmitter and receiver circuitry for the two wireless networks. For example, a single power amplifier may be able to amplify the uplink signals for both UMTS and cdma2000 if these signals are on two different frequency bands and the power amplifier is wideband.

Application processor 240 controls the operation of modem processors 210a and 210b and supports upper layer applications (e.g., for voice and packet data) that require the services of these modem processors. Main controller 250 controls the operation of various processing units at the multi-RAT device. Memories 242 and 252 store data and code used by controllers 240 and 250, respectively.

Figure 3:
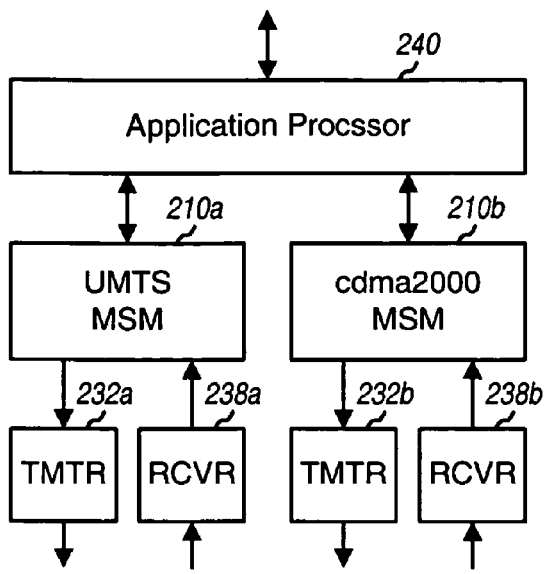
FIG. 3 shows another view of the multi-RAT device.

FIG. 3 shows another view of multi-RAT device 150 from an application standpoint. UMTS MSM 210a and cdma2000 MSM 210b independently perform processing for the UTRAN and cdma2000 RAN, respectively. Application processor 240 sends 'commands' to direct the operation of the UMTS MSM and cdma2000 MSM and receives 'events' for information/conditions from these MSMs.

The dual-mode capability of the multi-RAT device may be made known to the UTRAN so that the UTRAN can discriminate the multi-RAT device from single-mode (e.g., UMTS only) wireless devices. This discrimination is needed in order to facilitate inter-system handoff between the UTRAN and cdma2000 RAN. Several techniques for communicating the device capability to the UTRAN are described below.

Figure 4A:
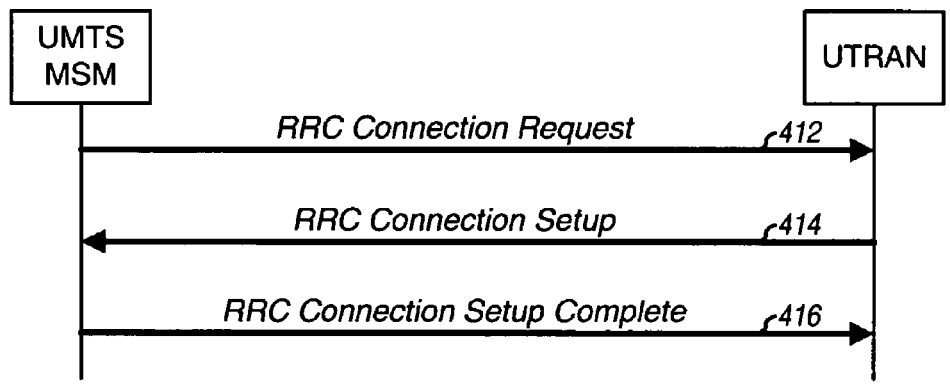
FIGS. 4A and 4B show two procedures to convey the capability of the multi-RAT device to the UTRAN.

FIG. 4A shows a Radio Resource Control (RRC) Connection Setup Completion procedure used to establish a connection (or call) for the multi-RAT device and to convey the device capability to the UTRAN. RRC is part of Layer 3 in the UMTS protocol stack, provides information transfer service to a Non Access Stratum (NAS), and controls the configuration of Layers 1 and 2 in the protocol stack. NAS is a functional layer that supports traffic and signaling messages between the wireless device and the core network with which the UTRAN interfaces.

The multi-RAT device (or more specifically, the UMTS MSM) initiates the RRC Connection Setup Completion procedure by sending an RRC Connection Request message (step 412). This message contains an "Establishment Cause" value that is set to originating or terminating a call. The UTRAN then sends an RRC Connection Setup message with pertinent information to set up the call (step 414). This message contains a "Capability Update Requirement" information element (IE) that has a "System Specific Capability Update Requirement" field set to, e.g., 'IS-2000'. Release 99 of 3GPP TS 25-331 defines a single enumerate (or value) of 'GSM' for the "System Specific Capability Update Requirement" field. A new enumerate of 'IS-2000' may be defined for this field.

The multi-RAT device performs connection setup in accordance with the information included in the RRC Connection Setup message. Upon completion of the setup, the multi-RAT device sends an RRC Connection Setup Complete message to the UTRAN (step 416). This message contains an "Inter-RAT UE Radio Access Capability" information element that encapsulates multiple cdma2000 (e.g., IS-2000) messages. For example, this information element may contain three instances of an IS-2000 Status Message, with each message instance containing a different information record. Various pieces of pertinent information may be sent to the UTRAN such as, for example, device information (e.g., SLOT_CYCLE_INDEX, station class mark, mobile manufacturing code, and model), a 15-bit International Mobile Subscriber Identity (IMSI) code used to identify the home country and network of the device, and an Electronic Serial Number (ESN) for the device. The ESN is a unique identification number that is embedded or inscribed on a microchip in the device by the manufacturer and is used to validate the device and prevent fraud.

Figure 4B:
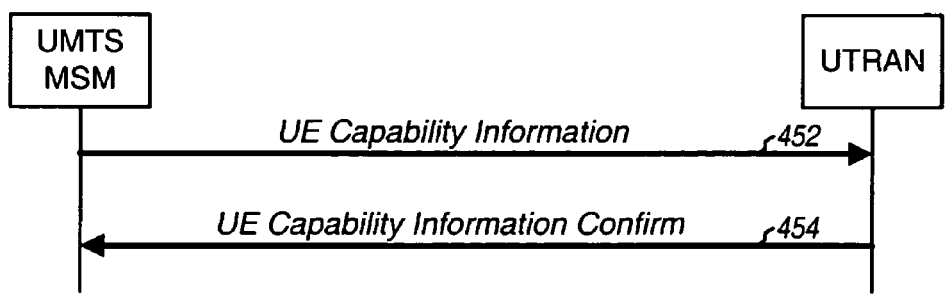

FIG. 4B shows a procedure used by the multi-RAT device to autonomously send its capability to the UTRAN. After successful establishment of an RRC connection, the UMTS MSM autonomously sends a UE Capability Information message (step 452). This message contains the "Inter-RAT UE Radio Access Capability" information element that encapsulates multiple cdma2000 messages with various pieces of pertinent information, as described above. The UTRAN replies with a UE Capability Information Confirm message to acknowledge receipt of the message sent by the multi-RAT device (step 454). The messages and information elements for UMTS are described in 3GPP TS 25-331.

As noted above, the UMTS MSM and cdma2000 MSM maintain the protocol stacks for the UTRAN and cdma2000 RAN, respectively. The UMTS MSM and cdma2000 MSM also maintain state machines for Layer 3 and other functions (call control) for their respective networks. For clarity, the state machine for Layer 3 of IS-2000 is described below.

Figure 5:
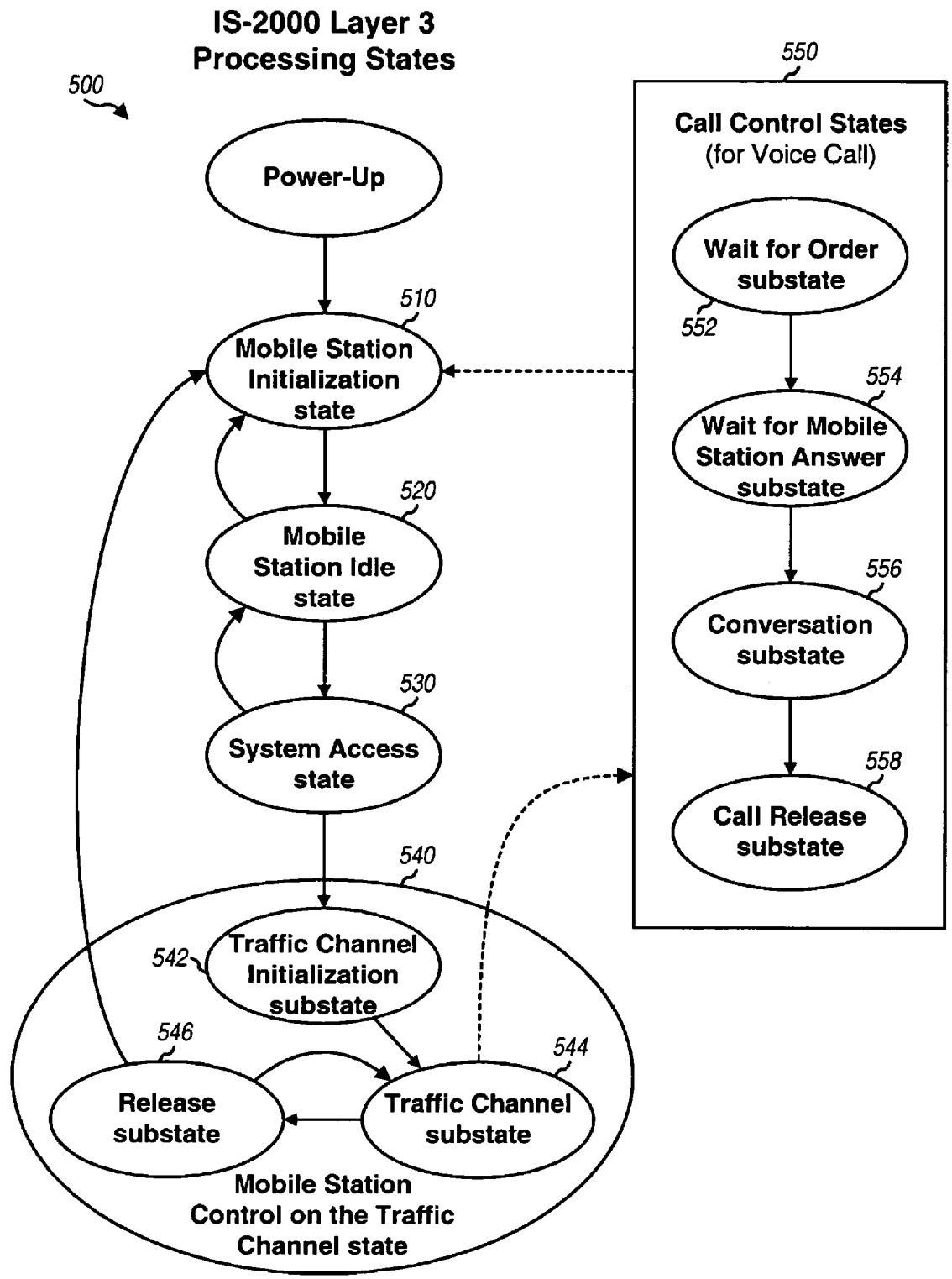
FIG. 5 shows Layer 3 processing states for IS-2000.

FIG. 5 shows a state diagram 500 of Layer 3 processing states for IS-2000. Upon power-up, the cdma2000 MSM transitions to a Mobile Station Initialization state 510. The cdma2000 MSM remains in state 510 while idle and, upon receiving an appropriate command from the application processor, acquires the cdma2000 RAN. Upon acquiring cdma2000 system timing, the cdma2000 MSM transitions to a Mobile Station Idle state 520. In state 520, the cdma2000 MSM can receive or originate a call, perform registration, receive or initiate a message transmission, and perform other actions. Normally, upon initiating any of these actions, the cdma2000 MSM transitions to a System Access state 530 to access the cdma2000 RAN. In state 530, the cdma2000 MSM exchanges signaling with the cdma2000 RAN on forward and reverse common channels and is directed to a dedicated traffic channel. The cdma2000 MSM proceeds from state 530 to a Mobile Station Control on the Traffic Channel state 540 if an IS-2000 call is active and communicates with the cdma2000 RAN in state 540. The cdma2000 MSM returns to state 510 upon terminating the call.

FIG. 5 also shows the substates of Mobile Station Control on the Traffic Channel state 540. In a Traffic Channel Initialization substate 542, the cdma2000 MSM verifies that it can receive a forward traffic channel and begins transmitting on a reverse traffic channel. In a Traffic Channel substate 544, the cdma2000 MSM exchanges data with the cdma2000 RAN in accordance with a service configuration. In a Release substate 546, the cdma2000 MSM disconnects the IS-2000 call and releases the traffic channels.

FIG. 5 further shows a call control state machine 550 maintained by the cdma2000 MSM for a voice call. In a Waiting for Order substate 552, the cdma2000 MSM waits for a message from the cdma2000 RAN indicating how and when to ring the phone. In a Waiting for Mobile Station Answer substate 554, the cdma2000 MSM waits for a user response for the call. The cdma2000 MSM transitions to a Conversation substate 556 upon receiving the user response and communicates with the cdma2000 RAN via the assigned traffic channels and in accordance with the service configuration. The cdma2000 MSM transitions to a Call Release substate 558 upon receiving a command from the user or the cdma2000 RAN to release the call, confirms the call disconnection, and returns to Mobile Station Initialization state 510.

The states and substates for IS-2000 are described in 3GPP2 C.S0005-C, entitled "Upper Layer (Layer 3) Signaling Standard for cdma2000 Spread Spectrum Systems, Release C." 3GPP similarly describes state diagrams for UMTS calls in 3GPP TS 25-331.

As shown in FIG. 1, the multi-RAT device may be mobile and may move about the coverage areas of the UTRAN and cdma2000 RAN. The multi-RAT device may be in communication with one network (e.g., the UTRAN) and move out of the coverage area of this network and into the coverage area of the other network (e.g., the cdma2000 RAN). When this occurs, it is desirable to hand over the multi-RAT device from the serving network to a target network which may be more suitable (e.g., have better signal quality).

Inter-system handoff schemes to hand over the multi-RAT device from the UTRAN to the cdma2000 RAN are described herein. These handoff schemes include: (1) a measurement assisted hard handoff (MAHHO) scheme, (2) a measurement directed hard handoff (MDHHO) scheme, and (3) a call re-establishment hard handoff (CRHHO) scheme. These schemes may be performed based on the two-modem processor design shown in FIG. 2 for the multi-RAT device. The signal flows described below for the inter-system handoff schemes can also serve as flow diagrams for procedures to be performed by the multi-RAT device and network entities.

A. Measurement Assisted Hard Handoff (MAHHO)

MAHHO is an inter-system handoff technique in which the UTRAN uses measurements obtained by the multi-RAT device to determine suitable cdma2000 cell(s) to hand over the device. For example, the UTRAN may use MAHHO to trigger handover of the multi-RAT device to target cells whose signal quality has been measured and reported by the device while in a conversation state on the serving network. MAHHO improves the probability of successful handoff, especially when the base stations for the source and target cells are not co-located. MAHHO may be performed with two procedures—a candidate frequency search procedure and a handoff execution procedure.

Figure 6:
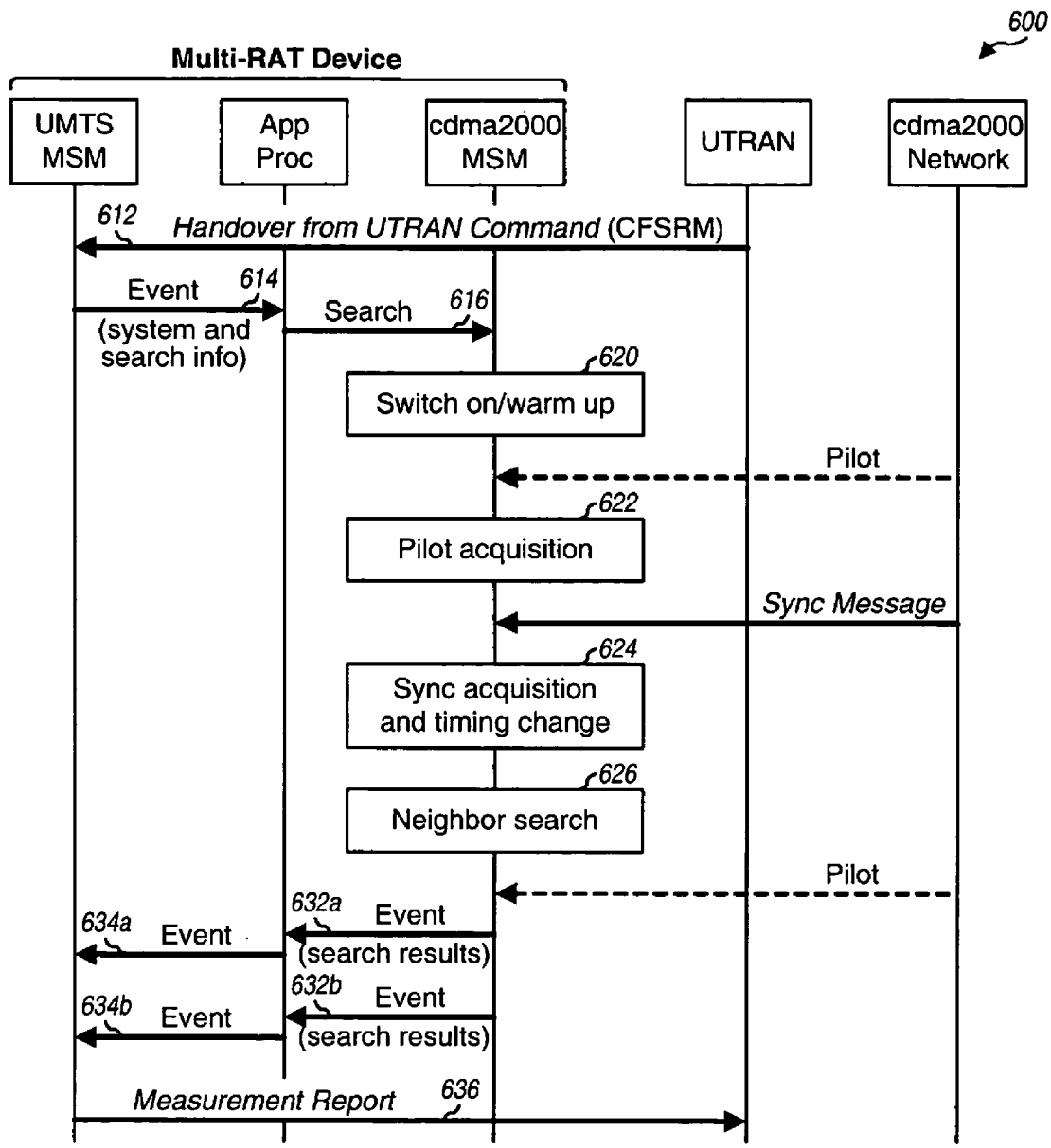
FIG. 6 shows a candidate frequency search procedure for MAHHO.

FIG. 6 shows an exemplary candidate frequency search procedure 600 for MAHHO. When the multi-RAT device is in the coverage area of a border UMTS cell (which is a cell at the boundary of the UTRAN), the UTRAN enables either periodic or event based reporting of cdma2000 measurements by the device. This is achieved by sending a Handover from UTRAN Command to the device (step 612). This command contains the "Inter-RAT System Message" information element that encapsulates, e.g., an IS-2000 Candidate Frequency Search Request Message (CFSRM). The CFSRM carries search configuration (e.g., a candidate frequency search list, which is a list of frequencies to search for cdma2000 cells) and reporting criteria information (e.g., specifying which measurements to report to the UTRAN, and under which conditions such measurements are to be reported). The UTRAN may determine the candidate frequency search list based on a priori knowledge of cdma2000 cells that overlay with border UMTS cells.

The UMTS MSM receives the Handover from UTRAN Command from the UTRAN, extracts the CFSRM from the received command, and forwards the extracted message to the application processor (step 614). The application processor then activates or switches on the cdma2000 MSM and provides it with a search command and information from the CFSRM (step 616).

The cdma2000 MSM switches on the cdma2000 receiver (receiver unit 238*b* in FIG. 2) and waits a predetermined amount of time for the receiver circuitry to warm up (block 620). After the cdma2000 receiver has warmed up, the cdma2000 MSM starts pilot acquisition on each target frequency in the candidate frequency search list (block 622). Each UMTS and cdma2000 cell transmits a pilot that can be processed by the wireless devices in its coverage area to obtain system timing, frequency, and other information for that cell. If a cdma2000 pilot is found (which may be one that is not in the candidate frequency search list), then the cdma2000 MSM acquires synchronization with the cdma2000 cell transmitting this pilot and adjusts its timing for this cell (block 624). The sync acquisition may be performed based on a synchronization message sent by the cdma2000 cell. The cdma2000 MSM does not need to acquire system information from the cdma2000 cell and does not register with the cdma2000 RAN. The cdma2000 MSM then performs candidate frequency searches and reports search results according to the criteria sent in the CFSRM (block 626).

Since the multi-RAT device has established a connection with the UTRAN, the cdma2000 MSM sends the search results via this connection. The cdma2000 MSM sends the search results via the application processor to the UMTS MSM (step 632). The cdma2000 MSM remains active as long as the measurement reporting is active and is forced off-line whenever the measurement reporting is deactivated. The UMTS MSM then sends a Measurement Report message that contains the search results from the cdma2000 MSM (step 634). The extensions to the Measurement Report message that are used to carry the search results from the cdma2000 MSM are not defined by 3GPP in TS 25-331 Release 99.

The UTRAN obtains the search results from the multi-RAT device and determines if there is a cdma2000 cell that has better quality than the UMTS serving cell. If the handoff conditions are satisfied, as determined based on the measurement reports from the multi-RAT device, then the UTRAN initiates the handoff execution procedure to handoff the multi-RAT device from the UMTS serving cell to the better cdma2000 cell.

Figure 7:
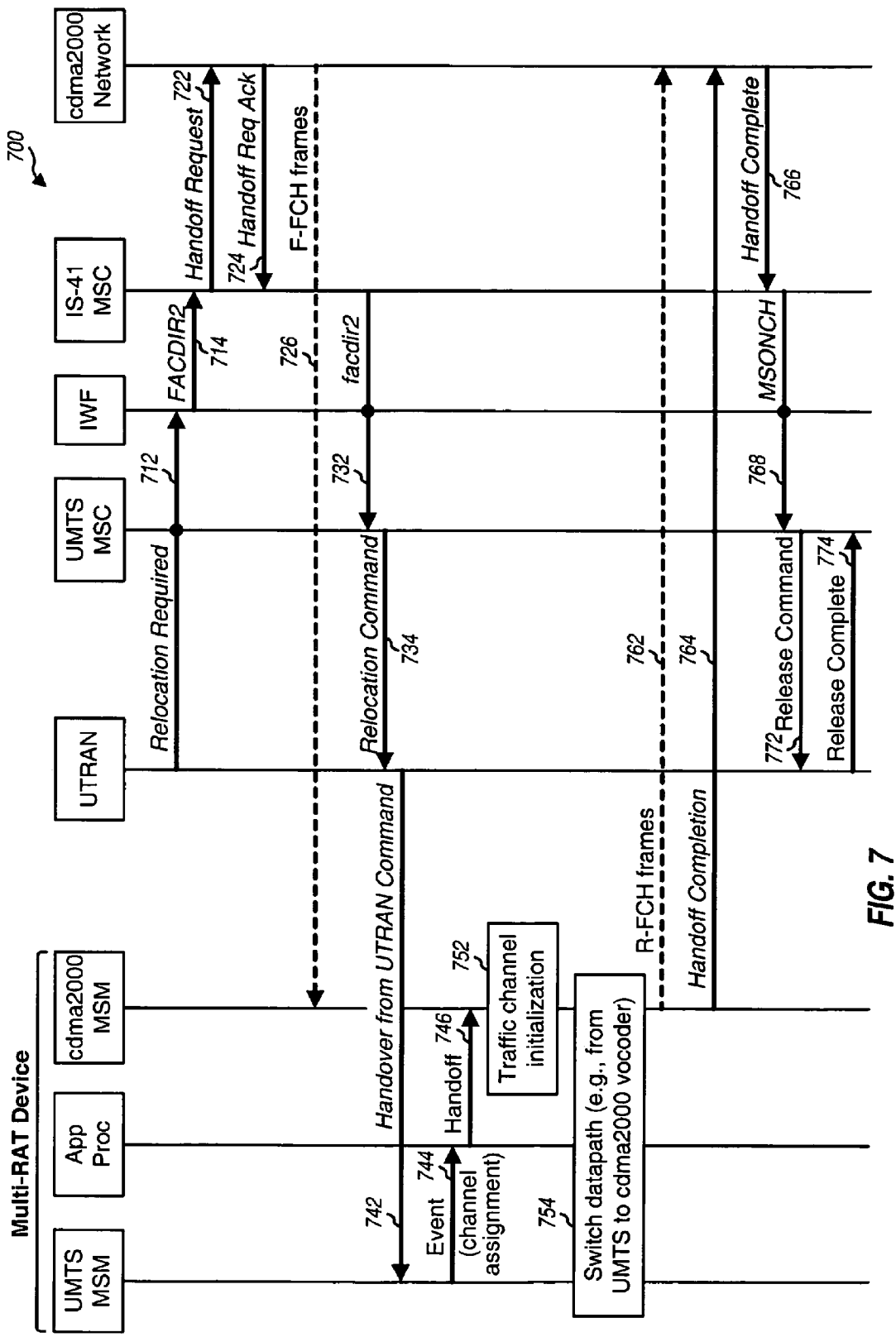
FIG. 7 shows a handoff execution procedure for MAHHO.

FIG. 7 shows an exemplary handoff execution procedure 700 for MAHHO. The UTRAN initiates the handoff by sending a Relocation Required message to the "source" UMTS MSC, which is the UMTS MSC currently handling the pending UMTS call for the multi-RAT device (step 712). This message allows the serving UTRAN RNC, which is the RNC with which the multi-RAT device currently has a signaling connection, to request relocation of the multi-RAT device to the RNC or BSC of another RAN. This message carries information regarding (1) the identity, capability, and location of the multi-RAT device (which may be obtained via one of the capability reporting procedures described in FIGS. 4A and 4B) and (2) candidate frequency search results (which may be obtained from the candidate frequency search procedure in FIG. 6). The source UMTS MSC forwards the Relocation Required message to the IWF, which converts this message into a FacilitiesDirective2 (FACDIR2) message and sends the new message to a target IS-41 MSC (step 714). The target IS-41 MSC is the MSC interfacing with the cdma2000 RAN to which the multi-RAT device is to be handed over.

The target IS-41 MSC receives the FACDIR2 message and, in response, sends a Handoff Request message to the cdma2000 BSC for the cdma2000 target cell(s) to initiate hard handoff for the multi-RAT device (step 722). The cdma2000 RAN then sends a Handoff Request Acknowledgment (Ack) message to the target IS-41 MSC (step 724) and signaling on a forward fundamental channel (F-FCH) to the multi-RAT device (step 726). The target IS-41 MSC also sends a facdir2 message via the IWF to the source UMTS MSC (step 732). The source UMTS MSC then sends a Relocation Command to the UTRAN (step 734). This message contains information normally carried in an IS-2000 Extended (or Universal) Handoff Direction Message (EHDM) for the cdma2000 target cell(s) to handover. The UTRAN then sends a Handover from UTRAN Command to the multi-RAT device to direct the device to perform handover (step 742). This command contains the "Inter-RAT System Message" information element, which encapsulates the EHDM, which in turn contains the information for the cdma2000 target cell(s).

The UMTS MSM receives the Handover from UTRAN Command, extracts the EHDM from the received command, and forwards the extracted EHDM to the application processor (step 744). The application processor then activates the cdma2000 MSM and gives it a handoff command (step 746). The cdma2000 MSM then enters a Traffic Channel Initialization substate to establish and synchronize the traffic channels for the downlink and uplink for the cdma2000 target cell(s) (block 752). The cdma2000 MSM achieves traffic channel establishment based on signaling received on the F-FCH (step 726) and signaling (e.g., a traffic channel preamble (TCH Preamble)) sent on a reverse link fundamental channel (R-FCH) (step 762). The F-FCH and R-FCH are traffic channels in cdma2000. The cdma2000 MSM bypasses the System Access state (see FIG. 5) for inter-system handoff because the cdma2000 MSM is immediately directed to a dedicated traffic channel for the hard handoff, and there is no need for the cdma2000 MSM to enter this state in order to exchange signaling on the forward and reverse common channels to establish the traffic channel.

Once the traffic channels have been established, the application processor switches datapath from the UMTS MSM to the cdma2000 MSM and starts processing data from the cdma2000 MSM (block 754). For example, for a voice call, the application processor switches from a UMTS vocoder to a cdma2000 vocoder. The transmitter and receiver units are also appropriately switched at the multi-RAT device. After passing the information from the Handover from UTRAN Command to the application processor, the UMTS MSM may release the pending UMTS call and deactivate itself either autonomously or under a command from the application processor.

Upon establishing the traffic channels, the cdma2000 MSM sends a Handoff Completion message (HCM) to the cdma2000 RAN to indicate successful completion of the handoff (step 764). The cdma2000 RAN then sends a Handoff Complete message to the target IS-41 MSC to notify it of the successful handoff (step 766). The target IS-41 MSC then sends a Mobile Station on Channel (MSONCH) message to the source UMTS MSC via the IWF (step 768). The source UMTS MSC then sends a Release Command on an Iu interface to the UTRAN to terminate the pending UMTS call on the UTRAN side (step 772). The UTRAN then sends a Release Complete message via the Iu interface to the source UMTS MSC to indicate that the UMTS call has been released (step 774). Steps 722 through 732 and steps 762 through 774 are performed as described in TIA/EIA/IS-2001.3-B, entitled "Interoperability Specification (IOS) for cdma2000 Access Network Interfaces." TIA/EIA/IS-2001.3-B also describes the messages between the MSC to cdma2000 BSC interface for handoffs between two BSCs that may or may not belong to the same MSC.

FIG. 7 shows a simple handoff case when a radio bearer is established and the multi-RAT device is in the Conversation substate in FIG. 5. The concept described in FIG. 7 may be extended to cases where the multi-RAT device is in the Waiting for Order substate or the Waiting for Mobile Station Answer substate.

B. Measurement Directed Hard Handoff (MDHHO)

MDHHO is a semi-blind inter-system handoff technique in which the source UTRAN relies on location information for the multi-RAT device to select the best cdma2000 target cell(s) for the device. The location information may be derived from the current active set for the multi-RAT device, round-trip delay (RTD) measurements at the base stations, and so on. The active set contains cells with which the device is in communication. MDHHO performance is degraded if (1) the base stations for the source and target cells are not located near each other and/or (2) the layouts of the source and target cells, which are determined by the orientation of the base station antennas, are different. The presence of repeaters also complicates the selection of target cell(s) since the additional delays introduced by the repeaters distort RTD estimates, which then become biased indicators of the location of the multi-RAT device. MDHHO performance is improved if the target network supports hard handoff into soft handoff, so that the device can communicate with multiple cells after the hard handoff. MDHHO is typically simpler to implement than MAHHO.

Two scenarios exist for MDHHO. The first scenario assumes that the cdma2000 MSM has not acquired the timing of the cdma2000 RAN at the time the multi-RAT device receives a handoff command from the UTRAN. The second scenario assumes that the cdma2000 MSM has acquired cdma2000 timing at the time of the handoff command.

Figure 8:
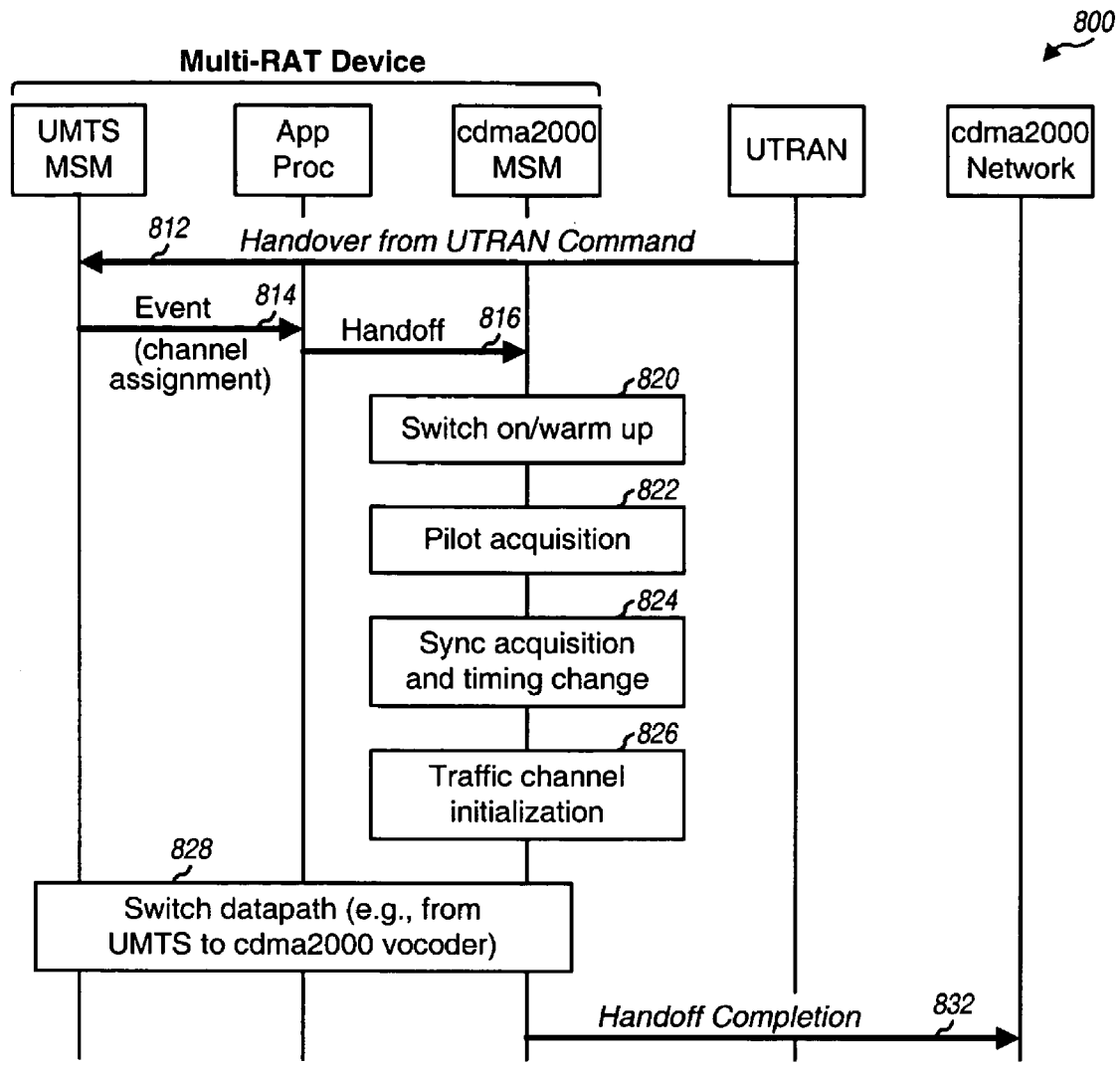
FIG. 8 shows a procedure for MAHHO with no prior sync information.

FIG. 8 shows an exemplary procedure 800 for MAHHO with no prior sync information. The UTRAN initiates handover by sending a Handover from UTRAN Command to the multi-RAT device and directs the device to perform the handover (step 812). This command carries the "Inter-RAT System Message" information element, which contains information for the cdma2000 target cell(s) to handover. The UTRAN determines the cdma2000 target cell(s) based on location information available for the multi-RAT device. For example, the UTRAN may query a local database of cdma2000 cells using the UMTS serving cell as a key.

The UMTS MSM receives the Handover from UTRAN Command, extracts the target cell information from the received command, and forwards the extracted information to the application processor (step 814). The UMTS MSM may deactivate itself autonomously or under a command from the application processor after passing up the extracted information. The application processor then activates the cdma2000 MSM and gives it a handoff command (step 816). The cdma2000 MSM switches on the cdma2000 receiver and waits for the receiver circuitry to warm up (block 820). After warm-up, the cdma2000 MSM starts pilot acquisition on each cdma2000 target cell (block 822). For each cdma2000 pilot found, the cdma2000 MSM acquires synchronization with the cdma2000 cell and adjusts its timing for that cell (block 824). The cdma2000 MSM then enters the Traffic Channel Initialization substate to establish traffic channels for the cdma2000 target cell(s) (block 826). The cdma2000 MSM bypasses the System Access state because it is immediately directed to a dedicated traffic channel. The application processor then switches datapath from the UMTS MSM to the cdma2000 MSM (e.g., switches vocoders for a voice call) and starts processing data from the cdma2000 MSM (block 828). Once the traffic channels have been established, the cdma2000 MSM sends a Handoff Completion message to the cdma2000 RAN to indicate successful completion of the handoff (step 832).

The procedure on the UTRAN and core network side for MAHHO with no prior sync information is as shown in FIG. 7.

For the MAHHO procedure shown in FIG. 8, the multi-RAT device performs both sync acquisition and handoff execution after receiving the handoff command from the UTRAN. The amount of time needed to perform the handover is longer when cdma2000 timing information is not known. To expedite the handover, cdma2000 timing may be obtained beforehand, i.e., before handover is initiated.

The multi-RAT device can acquire cdma2000 timing when (1) the UMTS MSM is in an Idle mode and camping on a UMTS cell that broadcasts System Information Type 13 (SIB13) information or (2) the UMTS MSM is in a Connected mode and its active set includes a UMTS cell that broadcasts the SIB13 information. The UMTS MSM is in (1) the Idle mode if it has registered with the UTRAN but does not have any activity and (2) the Connected mode if it has data to transmit and/or receive. The Idle and Connected modes are described in 3GPP TS 25.331. The SIB13 information includes system information (e.g., the identity, channel number, and band class) for cdma2000 neighbor cells, which are cdma2000 cells that overlap or are neighbors of the UMTS serving cell. The cdma2000 MSM may use the SIB13 information to search for cdma2000 neighbor cells while in communication with or camped on a UMTS cell. If the UMTS MSM is in the Connected mode, then it decodes a broadcast control channel (BCCH) from the UMTS serving cell or a UMTS neighbor cell to obtain both Management Information Base (MIB) and SIB13 information, which are then used to obtain a system frame number (SFN) that identifies the framing and timing of the UMTS cell.

Figure 9:
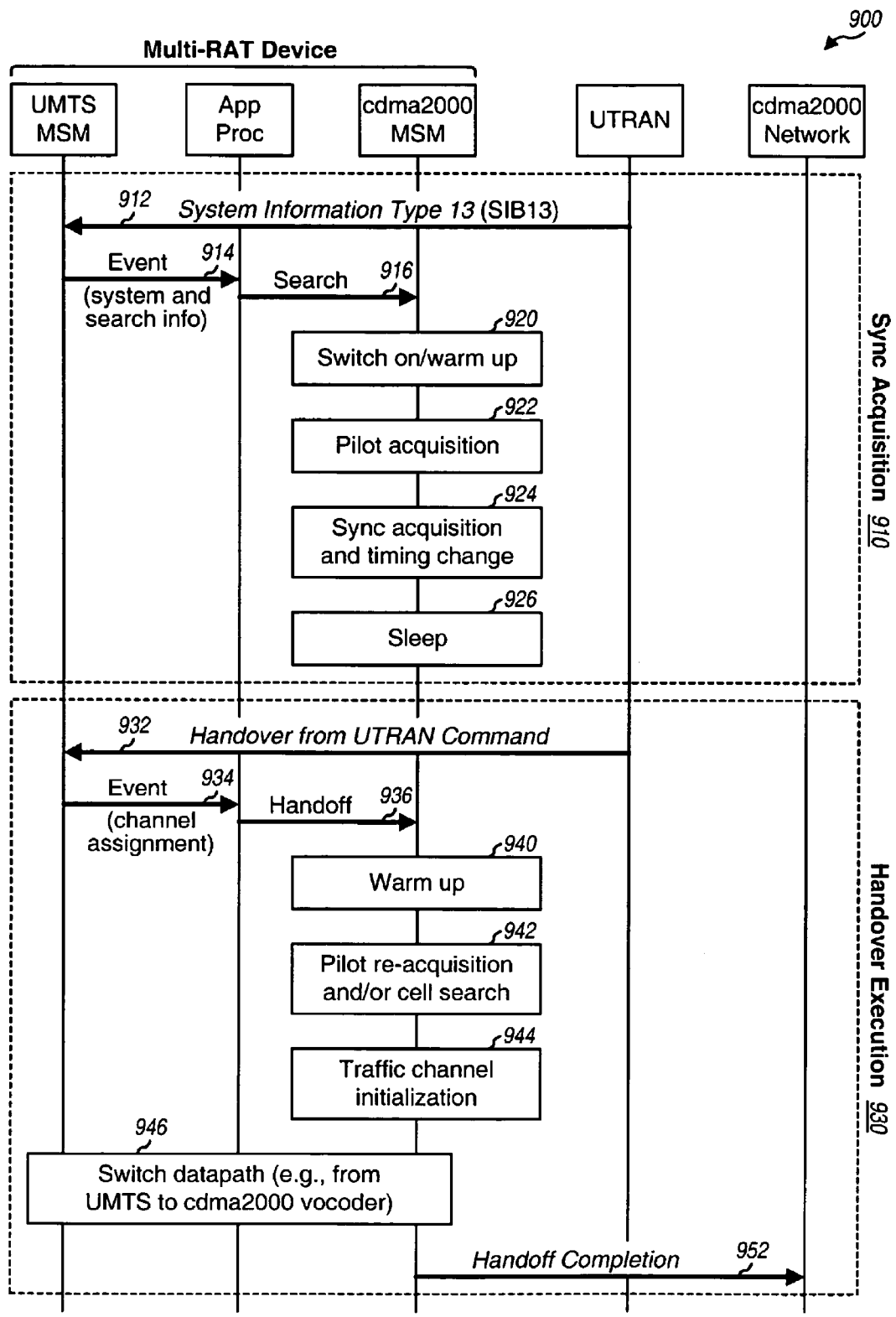
FIG. 9 shows a procedure for MAHHO with prior sync information.

FIG. 9 shows an exemplary procedure 900 for MAHHO with prior sync information. Procedure 900 includes a sync acquisition procedure 910 and a handover execution procedure 930. The multi-RAT device performs sync acquisition procedure 910, while the UMTS MSM is in the Idle or Connected mode, to acquire timing of cdma2000 cells so that handover can be performed more quickly if and when directed by the UTRAN. The multi-RAT device performs handover execution procedure 930 when handover is directed by the UTRAN. Handover execution procedure 930 is similar to the MAHHO procedure shown in FIG. 8, albeit without the sync acquisition in block 824.

For sync acquisition procedure 910, the UMTS MSM receives the SIB13 information broadcast by a UMTS cell (step 912) and forwards this information to the application processor (step 914). The application processor then activates the cdma2000 MSM and gives it a search command (step 916). The cdma2000 MSM switches on the cdma2000 receiver (block 920), starts pilot acquisition on each cdma2000 neighbor cell (block 922), and acquires synchronization and timing for each cdma2000 cell with acquired pilot (block 924). Steps 920, 922, and 924 may be performed as described above for steps 620, 622, and 624, respectively, in FIG. 6. The cdma2000 MSM does not enter the System Access state, does not decode the paging channel (PCH), and does not perform registration on the cdma2000 RAN. After acquiring the timing of the cdma2000 neighbor cells, the cdma2000 MSM enters a sleep state and only periodically wakes up to make measurements for these cells (block 926).

For handover execution procedure 930, the UMTS MSM receives a Handover from UTRAN Command from the UTRAN (step 932), extracts the target cell information from the received command, and forwards the information to the application processor (step 934). The application processor then activates the cdma2000 MSM (step 936). The cdma2000 MSM waits for the receiver circuitry to warm up (block 940), performs pilot re-acquisition on each cdma2000 target cell for which timing information is already known to obtain updated cell timing (block 942), and performs a search for each cdma2000 target cell for which timing information is not known (also block 942). The cdma2000 MSM then enters the Traffic Channel Initialization substate to establish traffic channels for the cdma2000 target cell(s) (block 944). The cdma2000 MSM bypasses the System Access state. The application processor then switches datapath (e.g., vocoder) from the UMTS MSM to the cdma2000 MSM and starts processing data from the cdma2000 MSM (block 946). Once the traffic channels have been established, the cdma2000 MSM sends a Handoff Complete Message to the cdma2000 RAN to indicate successful handover (step 952).

The procedure on the UTRAN and core network side for handover execution procedure 930 is as shown in FIG. 7.

C. Call Re-establishment Hard Handoff (CRHHO)

CRHHO is an inter-system handoff technique in which a new call is established on a target network and the pending call on the serving network is released. The call establishment and call release may be performed such that the handover appears seamless to the multi-RAT device and communication is minimally disrupted.

CRHHO may be achieved using several procedures—a mobile terminated (MT) call setup procedure and a mobile originated (MO) call setup procedure. For both procedures, the UTRAN may trigger CRHHO to the target cdma2000 RAN based on various criteria. For example, CRHHO may be triggered based on (1) measurements obtained for the multi-RAT device, (2) location information for the device, and/or (3) some other information or mechanisms. The measurements may be for quality metrics such as pilot energy-per-chip-to-noise ratio (Ec/Io), block error rate (BLER), traffic channel transmit power, and so on. The measurements may be used to detect when the multi-RAT device is located in an area of marginal UMTS coverage. The location information may include the current active set of the multi-RAT device, RTD measurements, and so on, and is used to detect when the multi-RAT device is near the edge of the UMTS coverage area.

Figure 10A:
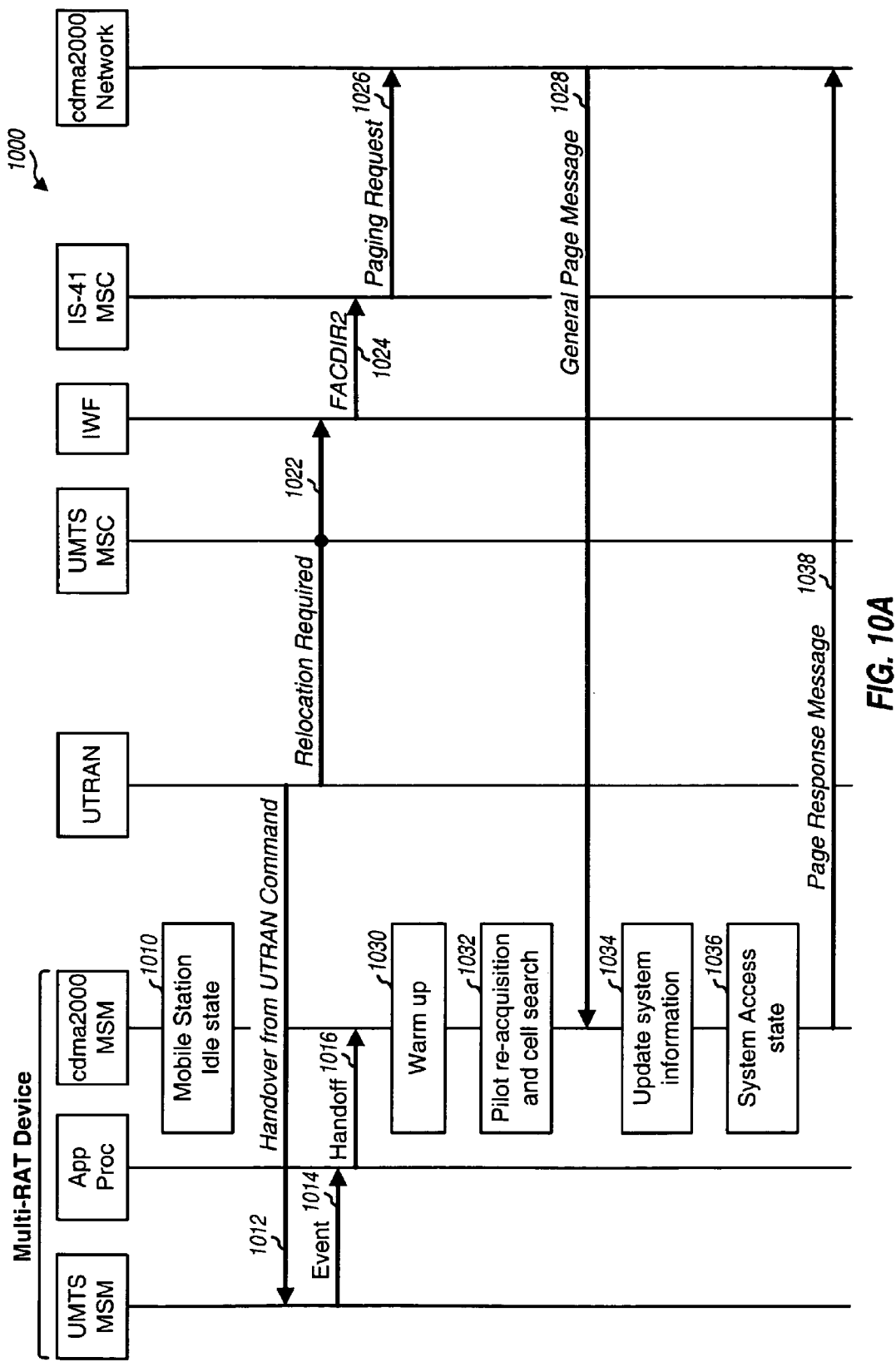
FIGS. 10A and 10B show a procedure for CRHHO with mobile terminated (MT) call re-establishment.

FIG. 10A shows the first portion of an exemplary procedure 1000 for CRHHO with mobile terminated call re-establishment. Initially, the multi-RAT device is active on a call with the UTRAN. To reduce handoff delay for CRHHO, the cdma2000 MSM is enabled at the time the UMTS call is established by the UMTS MSM, remains in the Mobile Station Idle state, but does not register with the cdma2000 RAN while in this state (block 1010).

The UTRAN initiates a handoff by sending a Handover from UTRAN Command to the multi-RAT device (step 1012). This command carries the "Inter-RAT System Message" information element, which contains information (e.g., frequency and band class) for the cdma2000 target cell(s) to handover. The UMTS MSM receives the Handover from UTRAN Command, extracts the target cell information from the received command, and forwards the extracted information to the application processor (step 1014). The application processor then activates the cdma2000 MSM and gives it a wakeup/handoff command (step 1016).

The UTRAN also sends to the source UMTS MSC a Relocation Required message to request relocation of the multi-RAT device (step 1022). This message carries (1) information regarding the identity, capability, and location of the multi-RAT device, (2) slot cycle information, and (3) the identity of the cdma2000 target cell(s). The source UMTS MSC then sends to the target IS-41 MSC, via the IWF, a FACDIR2 message (or an equivalent message) that carries the cdma2000 related information and target cell identifier(s) (step 1024). The target IS-41 MSC then sends to the cdma2000 BSC for the cdma2000 target cell(s) a Paging Request message to initiate a mobile terminated call setup procedure with the multi-RAT device (step 1026). This message directs the multi-RAT device to bypass alerting (e.g., do not ring) since a UMTS call is currently pending at the device. The cdma2000 BTS(s) corresponding to the target cell(s) then pages the multi-RAT device by sending an IS-2000 General Page Message (GPM) on the paging channel with the address of the multi-RAT device. This GPM commands the multi-RAT device to bypass alerting.

Upon receiving the wakeup command, the cdma2000 MSM switches on and warms up the cdma2000 receiver (block 1030), performs pilot re-acquisition on each cdma2000 target cell for which timing is already known (block 1032), and performs a cell search for cdma2000 target cells for which timing is not known (also block 1032). The cdma2000 MSM then receives the IS-2000 General Page Message from each cdma2000 cell for which timing has been acquired (step 1028) and updates overhead information for each cdma2000 cell with a received GPM (block 1034). The cdma2000 MSM enters the System Access state for each cdma2000 cell with updated overhead information and sends access probes on the reverse link via an access channel to access the cdma2000 RAN (block 1036). Upon receiving the GPM, the cdma2000 MSM sends an IS-2000 Page Response Message (PRM) to the cdma2000 RAN to acknowledge the page (step 1038).

Figure 10B:
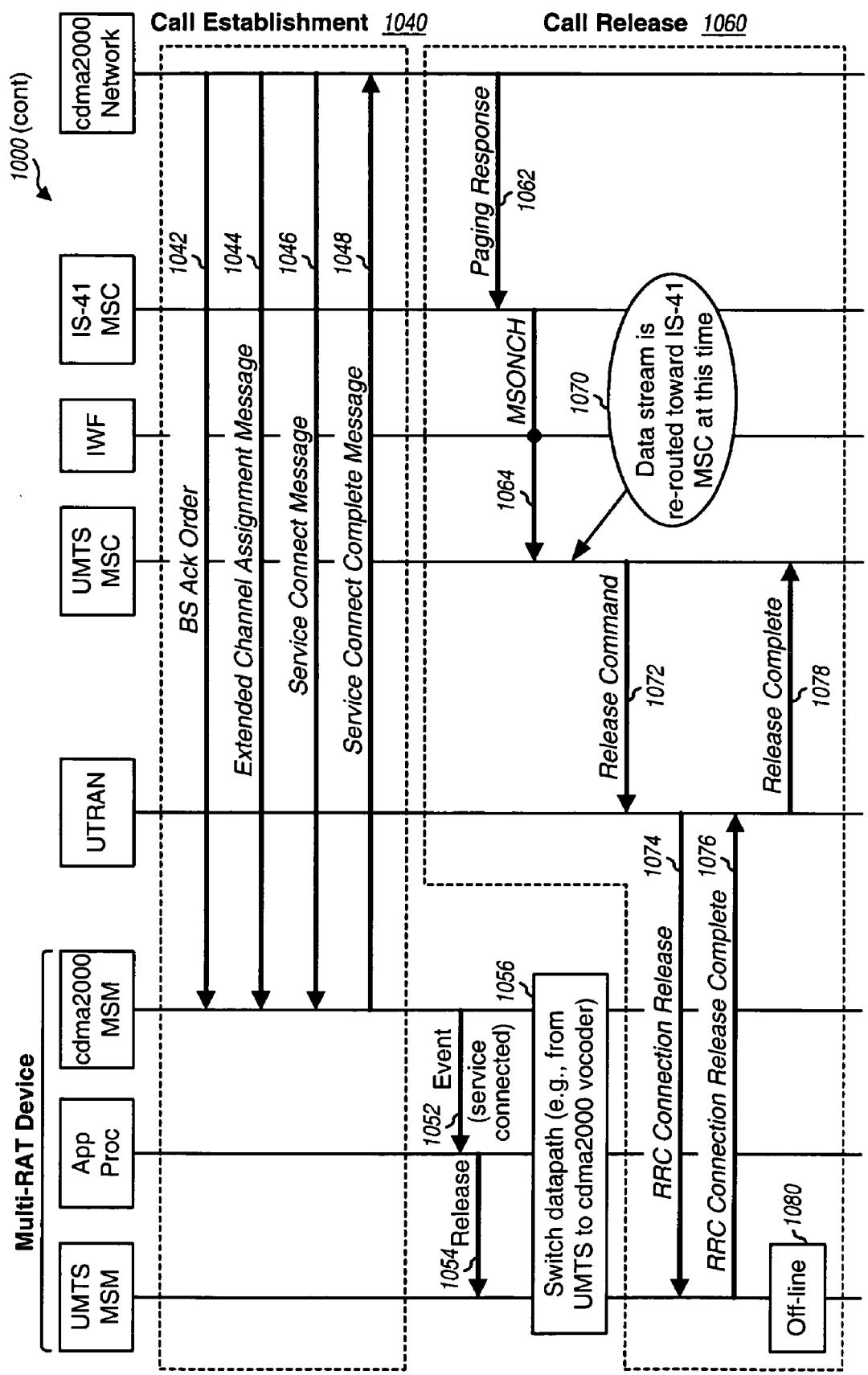

FIG. 10B shows the second portion of CRHHO procedure 1000. Upon receiving the PRM from the multi-RAT device, the cdma2000 RAN (1) performs a call establishment procedure 1040 to establish a new call with the multi-RAT device and (2) initiates a call release procedure 1060 to terminate the current call between the device and the UTRAN. Procedure 1040 may be performed concurrently with procedure 1060 and may be timed such that the communication for the multi-RAT device is minimally disrupted.

For call establishment procedure 1040, the cdma2000 RAN sends a Base Station Acknowledgment Order (BS Ack Order) to the cdma2000 MSM to acknowledge receipt of the PRM (step 1042). The cdma2000 RAN then sends to the cdma2000 MSM (1) an IS-2000 Extended Channel Assignment Message (ECAM) to initiate the establishment of a traffic channel (step 1044) and (2) an IS-2000 Service Connect Message (SCM) that specifies the service configuration for the new cdma2000 call (step 1046). The cdma2000 MSM sends an IS-2000 Service Connect Complete Message to the cdma2000 RAN to acknowledge receipt of the SCM (step 1048). The cdma2000 MSM then begins processing traffic from the cdma2000 RAN in accordance with the specified service configuration.

Upon completing the service configuration, the cdma2000 MSM notifies the application processor that service to the cdma2000 RAN is connected (step 1052). The application processor then commands the UMTS MSM to terminate the current UMTS call (step 1054), switches datapath from the UMTS MSM to the cdma2000 MSM (e.g., switches vocoder for a voice call), and starts processing data from the cdma2000 MSM (block 1056).

For call release procedure 1060, the cdma2000 RAN sends an IS-2000 Paging Response message to the target IS-41 MSC to acknowledge the Paging Request message (step 1062). The target IS-41 MSC then sends to the source UMTS MSC, via the IWF, a Mobile Station on Channel (MSONCH) message that informs the UMTS MSC that the call is now under the control of the IS-41 MSC(step 1064). The inter-MSC trunk is connected and the data stream for the multi-RAT device is re-routed toward the target IS-41 MSC (instead of the UMTS MSC) from this point forward (block 1070). For a voice call, pulse code modulation (PCM) is used to encode analog voice into 64 Kbps digital data, and the PCM stream for the multi-RAT device is re-routed toward the target IS-41 MSC. The source UMTS MSC then sends a Release Command on the Iu interface to the UTRAN (step 1072). Upon receiving this command, the UTRAN performs an RRC connection release procedure with the multi-RAT device by sending an RRC Connection Release message to the UMTS MSM (step 1074) and receiving an RRC Connection Release Complete message from the UMTS MSM (step 1076). The UTRAN then sends a Release Complete message via the Iu interface to the source UMTS MSC to indicate that the UMTS call has been released (step 1078). The UMTS MSM goes off-line upon releasing the UMTS call (block 1080).

Figure 11A:
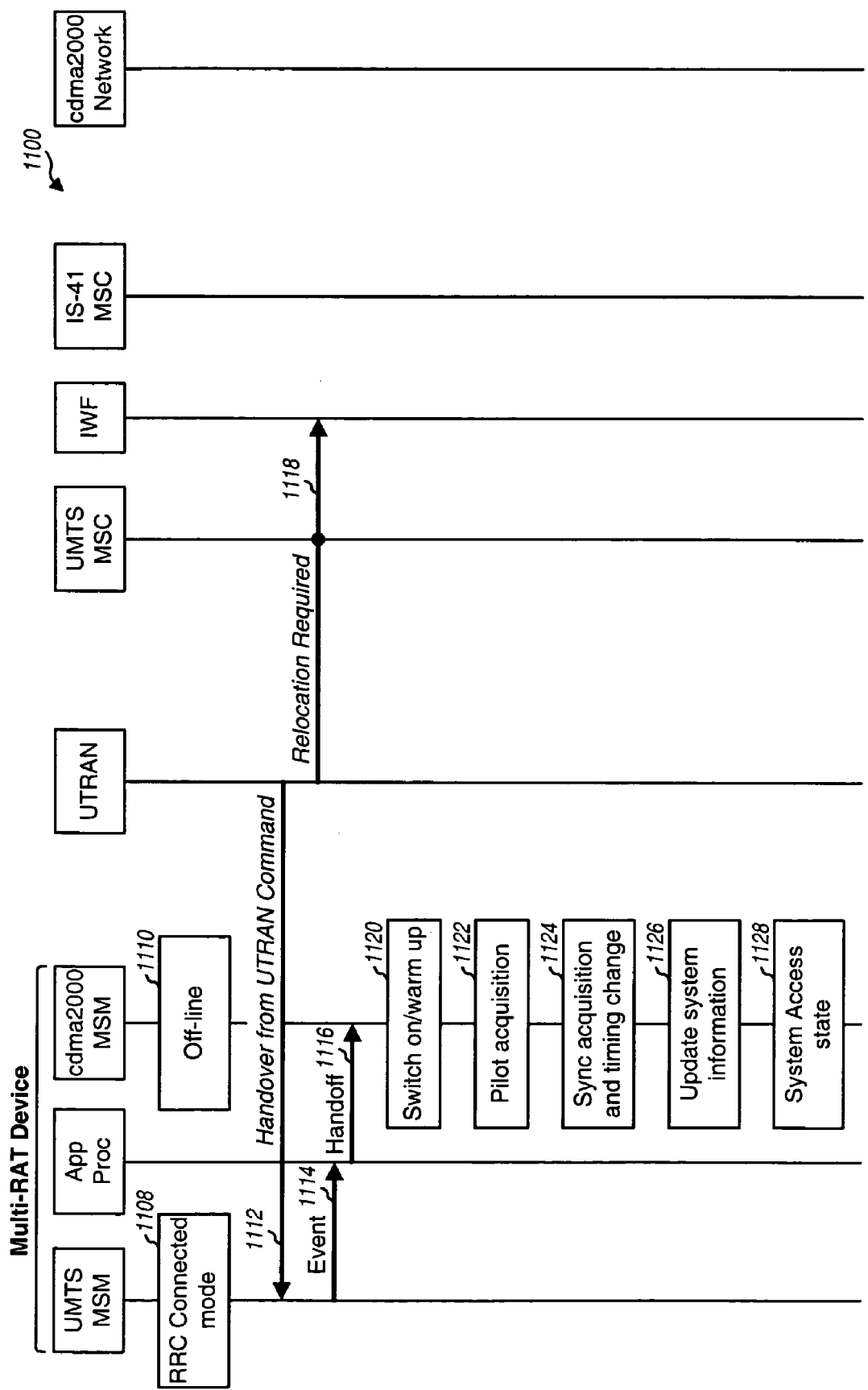
FIGS. 11A and 11B show a procedure for CRHHO with mobile originated (MO) call re-establishment.

FIG. 11A shows the first portion of an exemplary procedure 1100 for CRHHO with mobile originated call re-establishment. Initially, the multi-RAT device is active on a call with the UTRAN, the UMTS MSM is in the Connected mode (block 1108), and the cdma2000 MSM is off line (block 1110).

The UTRAN initiates a handoff by sending to the multi-RAT device a Handover from UTRAN Command that carries the "Inter-RAT System Message" information element with information for the cdma2000 target cell(s) (step 1112). The UMTS MSM receives the Handover from UTRAN Command and extracts and provides the target cell information to the application processor (step 1114). The application processor then activates the cdma2000 MSM and gives it a wakeup/handoff command (step 1116). The UTRAN also sends to the IWF, via the source UMTS MSC, a Relocation Required message to request relocation of the multi-RAT device (step 1118).

Upon receiving the handoff command, the cdma2000 MSM switches on and warms up the cdma2000 receiver (block 1120), performs pilot acquisition on each cdma2000 target cell (block 1122), acquires sync and timing for each cdma2000 cell with acquired pilot (block 1124), updates system information for each cdma2000 cell with acquired sync and timing (block 1126), and enters the System Access state and attempts access on each cdma2000 cell with updated system information (block 1128).

Figure 11B:
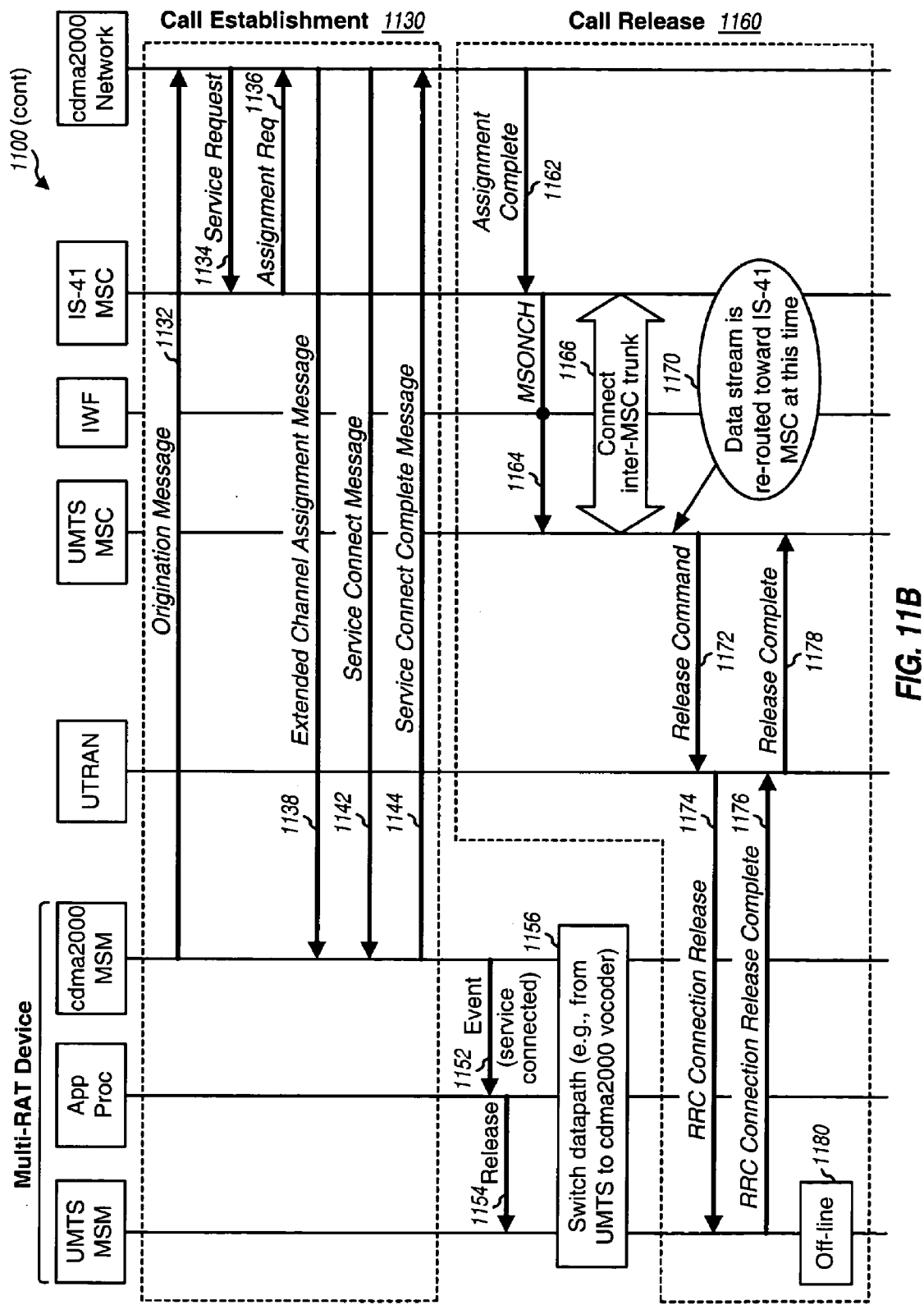

FIG. 11B shows the second portion of CRHHO procedure 1100, which includes a call establishment procedure 1130 and a call release procedure 1160. For call establishment procedure 1130, upon successfully completing the system access, the cdma2000 MSM sends to the cdma2000 RAN an IS-2000 Origination Message containing a pre-defined feature code string that is associated with call re-establishment (step 1132). The cdma2000 RAN then sends to the target IS-41 MSC a Service Request message that contains the feature code string (step 1134). The target IS-41 MSC responds by sending an Assignment Request message that contains the information used by the cdma2000 RAN to set up a connection with the cdma2000 MSM (step 1136). The cdma2000 RAN then sends (1) an Extended Channel Assignment Message to direct the multi-RAT device onto a traffic channel (step 1138) and (2) an IS-2000 Service Connect Message that specifies the service configuration for the new cdma2000 call (step 1142). The cdma2000 MSM responds with an IS-2000 Service Connect Complete Message (step 1144).

The cdma2000 MSM thereafter begins processing traffic from the cdma2000 RAN in accordance with the specified service configuration. The cdma2000 MSM also notifies the application processor that service to the cdma2000 RAN is connected (step 1152). The application processor then commands the UMTS MSM to terminate the current UMTS call (step 1154), switches datapath from the UMTS MSM to the cdma2000 MSM (e.g., switches vocoder for a voice call), and starts processing data from the cdma2000 MSM (block 1156).

For call release procedure 1160, upon receiving the Service Connect Complete Message, the cdma2000 RAN sends an Assignment Complete message to the target IS-41 MSC (step 1162). The target IS-41 MSC then sends to the source UMTS MSC a signaling message that contains (1) information equivalent to that carried in an IS-41 Mobile Station on Channel message and (2) the identity of the cdma2000 target cell(s) (step 1164). The IWF binds the indication received from the IS-41 MSC with the pending call re-establishment instance (step 1066). The inter-MSC trunk is connected at this point, and the data (e.g., PCM) stream for the multi-RAT device is re-routed toward the target IS-41 MSC from this point forward (block 1170). The UMTS call is then released via signaling in steps 1172 through 1176, which correspond to steps 1072 through 1076 in FIG. 10B.

For CRHHO from UMTS to cdma2000, the UMTS MSM acts as if it is releasing a pending call, and the cdma2000 MSM acts as if it is establishing a new call. In general, CRHHO may be performed using existing network entities and requires no changes to the UMTS and cdma2000 protocol stacks. CRHHO does not require new functions, e.g., the call controls for (1) call release in UMTS and (2) call origination for cdma2000 do not need to be modified. Only new messages (new extensions) may be needed for CRHHO. Moreover, CRHHO may be performed without or with minimal interruption of service.

The inter-system handoff techniques described herein allow a multi-RAT device to be handed over from one network to another network in a seamless manner. Different handoff techniques have different requirements and advantages.

Table 1 lists the requirements for these handoff techniques.

TABLE 1

| | Requirements | Benefits |
|---|---|---|
| (a) MAHHO | Extensions are needed for RRC and RANAP. IS-41 HAP is needed at source MSC. cdma2000 MSM needs to implement a modified protocol state machine. UMTS MSM needs to process two new messages. Only one power amplifier is required because simultaneous transmission of both MSMs is not required. | Reliable target cell selection and shorter handoff delay. No changes are required to cdma2000 core network and BSC. |
| (b) MDHHO (without prior sync information) | Extensions are needed for RANAP. IS-41 HAP is needed at source MSC. cdma2000 MSM needs to implement a modified L3 state machine. Only one power amplifier is required because simultaneous transmission of both MSMs is not required. | No extensions are needed for RRC. Small impact to UMTS MSM. |
| (c) MDHHO (with prior sync information) | Extensions are needed for RANAP. IS-41 HAP is needed at source MSC. cdma2000 MSM needs to implement a modified protocol state machine. UMTS MSM needs to read SIB13. Only one power amplifier is required because simultaneous transmission of both MSMs is not required. | Shorter handoff delay than (b). Simpler to implement at the multi-RAT device than (a) but more complex than (b). |
| (d) CRHHO | New procedures and protocol changes are needed for RRC and RANAP. Longer handoff delay. Two power amplifiers are required because simultaneous transmission of both MSMs is required. | Minimum development cost to implement. No changes to UTRAN are required. |

RANAP (Radio Access Network Application Part) is the interface between the core network and the UTRAN RNC, and is the equivalent of the A1 interface in IS-41.

The inter-system handoff techniques described herein may be implemented by various means. For example, these techniques may be implemented in hardware, software, or a combination thereof. For a hardware implementation, the processing units used to perform the inter-system handoff at the wireless device (e.g., UMTS MSM 210*a*, cdma2000 MSM 210*b*, and application processor 240 in FIG. 2) may be implemented within one or more ASICs, digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Similarly, the processing units used to support inter-system handoff on the network side may be implemented within one or more ASICs, DSPs, and so on.

For a software implementation, the inter-system handoff techniques may be implemented with modules (e.g., procedures, functions, and so on) that perform the functions described herein. The software codes may be stored in a memory unit (e.g., memory 242 in FIG. 2) and executed by a processor (e.g., application processor 240). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device operable to communicate with first and second wireless communication networks of different radio access technologies, comprising:
   a first modem processor operative to perform processing for a pending call with the first wireless network implementing a first radio access technology from 3rd Generation Partnership Project (3GPP), receive a first message from the first wireless network to perform handoff to the second wireless network, wherein the first message comprises a list of target cells in the second wireless network determined by the first wireless network to have a target cell location corresponding to a location of the wireless device, transmit a search message comprising a list of frequencies corresponding to the target cells to search for in the second wireless network, and provide notification of the handoff; and
   a second modem processor operative to receive the search message and determine pilot acquisition for the list of frequencies and additional frequencies not included in the list of frequencies to produce a search result comprising the list of frequencies and the additional frequencies, acquire synchronization and timing for each cell for which pilot acquisition is determined, exchange a second message with the second wireless network implementing a second radio access technology from 3rd Generation Partnership Project 2 (3GPP2) to establish a new call with the second wireless network via one of the cells in the search result, perform a call setup procedure with the second wireless network to establish the new call, and perform processing for the new call with the second wireless network.

2. The wireless device of claim 1, further comprising:
   an application processor operative to receive the notification from the first modem processor, direct the second modem processor to establish the new call, and direct the first modem processor to release the pending call.

3. The wireless device of claim 2, wherein the application processor is operative to direct the first modem processor to release the pending call concurrently with the establishment of the new call or shortly after the new call has been established to minimize disruption of service.

4. The wireless device of claim 1, wherein the first radio access technology is Wideband Code Division Multiple Access (W-CDMA) and the second radio access technology is IS-2000.

5. The wireless device of claim 4, wherein the second modem processor is operative to perform a mobile terminated (MT) call setup procedure defined by IS-2000, and wherein the second message is a General Page Message sent by the second wireless network.

6. The wireless device of claim 4, wherein the second modem processor is operative to perform a mobile originated (MO) call setup procedure defined by IS-2000, and wherein the second message is an Origination Message sent to the second wireless network.

7. The wireless device of claim 1, wherein the pending and new calls are voice calls.

8. The wireless device of claim 1, wherein the first modem processor is operative to maintain a first protocol stack for communication with the first wireless network and the second modem processor is operative to maintain a second protocol stack for communication with the second wireless network.

9. The wireless device of claim 1, wherein the second modem processor is operative to perform pilot re-acquisition and cell search, as necessary, obtain updated system information, and perform system access for the second wireless network to establish the new call.

10. The wireless device of claim 1, wherein the wireless device is operable to communicate with the first and second wireless networks simultaneously.

11. The wireless device of claim 1, wherein the handoff is triggered by the first wireless network based on measurements obtained by the wireless device.

12. The wireless device of claim 1, wherein the first and second modem processors independently perform processing for the first and second wireless networks, respectively.

13. The wireless device of claim 1, wherein the first and second modem processors support concurrent communication with the first and second wireless networks.

14. The wireless device of claim 1, wherein the first and second modem processors are implemented with separate processors.

15. A method of performing a handoff between first and second wireless communication networks of different radio access technologies, comprising:
   processing a pending call with the first wireless network implementing a first radio access technology from 3rd Generation Partnership Project (3GPP);
   receiving a first message from the first wireless network to perform a handoff to the second wireless network, wherein the first message comprises, a list of target cells in the second wireless network determined by the first wireless network to have a target cell location corresponding to a location of the wireless device;
   transmitting a search message comprising a list of frequencies corresponding to the target cells to search for in the second wireless network;
   receiving the search message and determining pilot acquisition for the list of frequencies and additional frequencies not included in the list of frequencies to produce a search result comprising the list of frequencies and the additional frequencies;
   acquiring synchronization and timing for each cell for which pilot acquisition is determined;
   exchanging a second message with the second wireless network implementing a second radio access technology from 3rd Generation Partnership Project 2 (3GPP2) to establish a new call with the second wireless network via one of the cells in the search result;
   performing a call setup procedure with the second wireless network to establish the new call;
   processing the new call with the second wireless network;
   wherein the processing a pending call and the receiving a first message are performed by a first modem processor, and wherein the exchanging a second message, performing a call setup procedure, and processing the new call are performed by a second modem processor.

16. The method of claim 15, wherein the first radio access technology is Wideband Code Division Multiple Access (W-CDMA) and the second radio access technology is IS-2000.

17. An apparatus operable to perform a handoff between first and second wireless communication networks of different radio access technologies, comprising:
   means for processing a pending call with the first wireless network implementing a first radio access technology from 3rd Generation Partnership Project (3GPP);
   means for receiving a first message from the first wireless network to perform a handoff to the second wireless network, wherein the first message comprises a list of target cells in the second wireless network determined by the first wireless network to have a target cell location corresponding to a location of the wireless device;

means for transmitting a search message comprising a list of frequencies corresponding to the target cells to search for in the second wireless network;

means for receiving the search message and determining pilot acquisition for the list of frequencies and additional frequencies not included in the list of frequencies to produce a search result comprising the list of frequencies and the additional frequencies;

means for acquiring synchronization and timing for each cell for which pilot acquisition is determined;

means for exchanging a second message with the second wireless network implementing a second radio access technology from 3rd Generation Partnership Project 2 (3GPP2) to establish a new call with the second wireless network via one of the cells in the search result;

means for performing a call setup procedure with the second wireless network to establish the new call;

means for processing the new call with the second wireless network; and wherein the means for processing a pending call and the means for receiving a first message are independent of the means for exchanging a second message, the means for performing a call setup procedure, and the means for processing the new call.

18. The apparatus of claim 17, wherein the first radio access technology is Wideband Code Division Multiple Access (W-CDMA) and the second radio access technology is IS-2000.

19. An apparatus in a UMTS (Universal Mobile Telecommunications System) Terrestrial Radio Access Network (UTRAN), comprising:

means for processing a pending call with a wireless device in a first wireless network;

means for sending a first message to the wireless device to perform a handoff to a cdma2000 radio access network (RAN), wherein the first message comprises a list of target cells in the second wireless network determined by the first wireless network to have a target cell location corresponding to a location of the wireless device;

means for sending a search message comprising a list of frequencies corresponding to the target cells to search for in the second wireless network;

means for receiving a search result comprising pilot acquisitions determined for the list of frequencies and additional frequencies not included in the list of frequencies, wherein the search result further comprises the list of frequencies and the additional frequencies, and wherein the search result further comprises each cell with which the wireless device acquired synchronization and timing based on the pilot acquisitions;

means for sending a second message to a UMTS mobile switching center (MSC) to request relocation of the wireless device to another MSC in the cdma2000 RAN;

means for receiving an indication of a new call established for the wireless device with the cdma2000 RAN via one of the cells in the search result; and means for terminating the pending call with the wireless device.

20. A wireless device operable to communicate with first and second wireless communication networks of different radio access technologies, comprising:

a first modem processor operative to perform processing for a pending call with the first wireless network implementing a first radio access technology from 3rd Generation Partnership Project (3GPP), receive a first message from the first wireless network to perform a handoff to the second wireless network, wherein the first message comprises a list of target cells in the second wireless network determined by the first wireless network to have a target cell location corresponding to a location of the wireless device, transmit a search message comprising a list of frequencies corresponding to the target cells to search for in the second wireless network and provide notification of the handoff;

a second modem processor operative to receive the search message and determine pilot acquisition for the list of frequencies and additional frequencies not included in the list of frequencies to produce a search result comprising the list of frequencies and the additional frequencies, acquire synchronization and timing for each cell for which pilot acquisition is determined, establish traffic channels with the second wireless network implementing a second radio access technology from 3rd Generation Partnership Project 2 (3GPP2) and perform processing for a new call with the second wireless network via one of the cells in the search result; and an application processor operative to receive the notification from the first modem processor and direct the second modem processor to establish the traffic channels and process the new call with the second wireless network.

21. The wireless device of claim 20, wherein the first radio access technology is Wideband Code Division Multiple Access (W-CDMA) and the second radio access technology is IS-2000.

22. The wireless device of claim 20, wherein the first message from the first wireless network includes information for one or more target cells in the second wireless network to which the wireless device is handed off.

23. The wireless device of claim 22, wherein the one or more target cells are determined by the first wireless network based on search results from the second modem processor for a list of frequencies in the second wireless network.

24. The wireless device of claim 20, wherein the second modem processor is further operative to send a second message to the second wireless network indicating successful completion of the handoff to the second wireless network.

25. The wireless device of claim 20, wherein the first modem processor is operative to autonomously terminate the pending call with the first wireless network after providing the notification of the handoff.

26. The wireless device of claim 20, wherein the application processor is further operative to direct the first modem processor to terminate the pending call with the first wireless network.

27. The wireless device of claim 20, wherein the first wireless network terminates the pending call based on signaling between the first and second wireless networks.

28. A method of performing a handoff between first and second wireless communication networks of different radio access technologies, comprising:

processing a pending call with the first wireless network implementing a first radio access technology from 3rd Generation Partnership Project (3GPP);

receiving a first message from the first wireless network to perform a handoff to the second wireless network, wherein the first message comprises a list of target cells in the second wireless network determined by the first wireless network to have a target cell location corresponding to a location of the wireless device;

transmitting a search message comprising a list of frequencies corresponding to the target cells to search for in the second wireless network;

receiving the search message and determining pilot acquisition for the list of frequencies and additional frequencies not included in the list of frequencies to produce a search result comprising the list of frequencies and the additional frequencies;

acquiring synchronization and timing for each cell for which pilot acquisition is determined;

establishing traffic channels with the second wireless network implementing a second radio access technology from 3rd Generation Partnership Project 2 (3GPP2);

processing a new call with the second wireless network via one of the cells in the search result;

wherein the processing a pending call and the receiving a first message are performed by a first modem processor, and wherein the establishing traffic channels and the processing a new call are performed by a second modem processor.

29. The method of claim 28, wherein the first radio access technology is Wideband Code Division Multiple Access (W-CDMA) and the second radio access technology is IS-2000.

30. An apparatus operable to perform a handoff between first and second wireless communication networks of different radio access technologies, comprising:

means for processing a pending call with the first wireless network implementing a first radio access technology from 3rd Generation Partnership Project (3GPP);

means for receiving a first message from the first wireless network to perform a handoff to the second wireless network, wherein the first message comprises a list of target cells in the second wireless network determined by the first wireless network to have a target cell location corresponding to a location of the wireless device;

means for transmitting a search message comprising a list of frequencies corresponding to the target cells to search for in the second wireless network;

means for receiving the search message and determining pilot acquisition for the list of frequencies and additional frequencies not included in the list of frequencies to produce a search result comprising the list of frequencies and the additional frequencies;

means for acquiring synchronization and timing for each cell for which pilot acquisition is determined;

means for establishing traffic channels with the second wireless network implementing a second radio access technology from 3rd Generation Partnership Project 2 (3GPP2);

means for processing a new call with the second wireless network via one of the cells in the search result; and wherein the means for processing a pending call and the means for receiving a first message are independent of the means for establishing traffic channels and the means for processing a new call.

31. A non-transitory processor-readable memory having instructions stored thereon, the instructions comprising:

code executable by a processor for processing a pending call with the first wireless network implementing a first radio access technology from 3rd Generation Partnership Project (3GPP);

code executable by a processor for receiving a first message from the first wireless network to perform a handoff to the second wireless network, wherein the first message comprises a list of target cells in the second wireless network determined by the first wireless network to have a target cell location corresponding to a location of the wireless device;

code executable by a processor for transmitting a search message comprising a list of frequencies corresponding to the target cells to search for in the second wireless network;

code executable by a processor for receiving the search message and determining pilot acquisition for tile list of frequencies and additional frequencies not included in the list of frequencies to produce a search result comprising the list of frequencies and the additional frequencies;

code executable by a processor for acquiring synchronization and timing for each cell for which pilot acquisition is determined;

code executable by a processor for establishing traffic channels with the second wireless network implementing a second radio access technology from 3rd Generation Partnership Project 2 (3GPP2); and code executable by a processor for processing a new call with the second wireless network via one of the cells in the search result.

* * * * *